(12) United States Patent
Okuma

(10) Patent No.: US 6,923,109 B2
(45) Date of Patent: Aug. 2, 2005

(54) MOUNTING MECHANISM FOR A PUSH ROD OF A MASTER CYLINDER

(75) Inventor: Hiroshi Okuma, Tokyo (JP)

(73) Assignee: Nabco, Ltd. (JP)

( * ) Notice: Subject to any disclaimer, the term of this patent is extended or adjusted under 35 U.S.C. 154(b) by 57 days.

(21) Appl. No.: 10/723,875

(22) Filed: Nov. 26, 2003

(65) Prior Publication Data
US 2004/0206233 A1 Oct. 21, 2004

(30) Foreign Application Priority Data
Nov. 28, 2002 (JP) ........................................ 2002-345868

(51) Int. Cl.[7] .......................... F01B 29/00; B60T 11/16
(52) U.S. Cl. .......................... 92/128; 92/187; 403/133; 403/331
(58) Field of Search .......................... 92/128, 187, 188; 403/122, 124, 133, 138, 144, 331

(56) References Cited

U.S. PATENT DOCUMENTS

| | | | |
|---|---|---|---|
| 3,237,977 A | * | 3/1966 | Batchelder .................. 403/331 |
| 3,589,756 A | * | 6/1971 | Pruvot ........................ 403/124 |
| 3,852,982 A | * | 12/1974 | Faris ........................... 70/457 |
| 4,528,895 A | * | 7/1985 | Nakamura .................... 92/129 |
| 5,153,976 A | * | 10/1992 | Benchaar et al. ........... 403/122 |
| 5,794,512 A | * | 8/1998 | Prosch et al. ................. 92/128 |
| 6,336,329 B1 | | 1/2002 | Adler et al. |
| 6,470,791 B1 | | 10/2002 | Welter et al. |

FOREIGN PATENT DOCUMENTS

| | | |
|---|---|---|
| FR | 716.733 | 12/1931 |
| GB | 959138 | 5/1964 |

* cited by examiner

Primary Examiner—Thomas E. Lazo
(74) Attorney, Agent, or Firm—Gerald E. Hespos; Anthony J. Casella

(57) ABSTRACT

A hollow cylinder has an opening at one end, and a push rod passes through the opening so that a coupling at one end of the push rod is in the cylinder. A piston is reciprocally movably in the cylinder, and a spring urges the piston into contact with the coupling. The opening includes a through groove configured to pass the coupling when the longitudinal axes of the cylinder and the push rod are normal and to prevent the coupling from coming out when the longitudinal axes of the cylinder and the push rod align. An insertion groove in the side surface of the cylinder is continuous with the through groove and is adapted for passing a rod portion in the inserting state.

13 Claims, 7 Drawing Sheets

[CLUTCH IN]

[CLUTCH OFF]

MOUNTING MECHANISM FOR A PUSH ROD OF A MASTER CYLINDER

BACKGROUND OF THE INVENTION

1. Field of the Invention

This invention relates to a mounting mechanism for a push rod of a master cylinder used in a hydraulic braking system or a hydraulic operating system of a clutch.

2. Description of the Related Art

A mechanism shown in FIG. 13 is known as a prior art mounting mechanism for a push rod of a master cylinder, for example, in Japanese Examined Utility Model Publication No. H03-15413.

FIG. 13 shows only a mounting mechanism for a push rod of a master cylinder. A cylinder hole 104 is formed in a cylinder main body 100, a piston 102 is slidably fitted into the cylinder hole 104, and a pressure chamber is defined between the piston 102 and the cylinder hole 104.

The piston 102 is pushed to left in FIG. 13 by a push rod 106. This push rod 106 has an end portion 105 held in contact with the piston 102 and is mounted in the cylinder main body 100. The push rod 106 is mounted into the cylinder main body 100 by inserting the end portion 105 into the cylinder hole 104, engaging a fastening member 107 for stopping a longitudinal movement with the end portion 105 and fixing the fastening member 107 by fitting a snap ring 108 into a groove 112 formed in the wall of the cylinder hole 104.

The end portion 105 is formed with a spherical projection 109, and the piston 102 and the push rod 106 are coupled by bringing the spherical projection 109 and a spherical recess 110 formed in the piston 102 together. The spherical projection 109 and the spherical recess 110 take the shapes of parts of spherical surfaces and the radii of curvature thereof are substantially equal.

The piston 102 is constantly pushed in a direction toward an opening 113 (rightward direction in FIG. 13) by a pushing force of a returning spring (not shown) for pushing the piston 102 or a hydraulic pressure by an operating device connected with the pressure chamber (e.g. a wheel cylinder of a braking system or a load acting on an operating cylinder of a hydraulic operating system of a clutch). Accordingly, the push rod 106 is stationary while being held in contact with the fastening member 107 in a non-operative state of an unillustrated pedal, whereas the push rod 106 is moved to left in FIG. 13 to be separated from the fastening member 107 when the pedal is operated, whereby the piston 102 is moved.

The spherical projection 109 of the end portion 105 and the spherical recess 110 of the piston 102 described above are designed to prevent a pushing position, where the push rod 106 pushes the piston 102, from being largely changed even if a pedal side (right side in FIG. 13) of the push rod 106 should shake.

In the prior art mounting mechanism thus constructed, the fastening member 107 for hindering a movement of the push rod 106 toward the opening 113 and the snap ring 108 for fixing the fastening member 107 are used at an opening end of the cylinder hole 104 as described above.

However, in this mechanism, it is necessary, upon mounting the push rod 106 into the end of the cylinder main body 100, to mount the fastening member 107 on the push rod 106, push the piston 102 by means of the end portion 105 of the push rod 106 to insert the fastening member 107 into the groove 112 and fit the snap ring 108 to fix the fastening member 107. Therefore, there is a disadvantage of necessitating a tool (ordinary tool, special tool or the like) for mounting the push rod 106 and a disadvantage of necessitating parts for mounting (ordinary fastening part, retaining part, etc.). Further, since the snap ring 108 and the fastening member 107 are small parts, an assembling operation is cumbersome.

SUMMARY OF THE INVENTION

It is an object of the present invention to provide a mounting mechanism for a push rod of a master cylinder which is free from the problems residing in the prior art.

It is another object of the present invention to provide a mounting mechanism for a push rod of a master cylinder which enables the push rod to be readily and easily mounted into a cylinder main body without using a tool for mounting and a part for mounting.

According to an aspect of the invention, a mounting mechanism is adapted for a push rod of a master cylinder. A piston is reciprocally movably provided in a cylinder hole of a main body of the cylinder having openings at the opposite ends. The piston is brought into contact by a pushing force of a returning spring with one end of the push rod inserted and mounted from the one end of the cylinder main body. The push rod includes a radially projecting coupling end at the end thereof to be brought into contact with the piston.

The mounting mechanism includes: in the opening side of the cylinder main body that the push rod is to be mounted, a through groove formed at an end surface of the cylinder main body to have such a shape as to pass the coupling end in an inserting state where the longitudinal axes of the cylinder main body and the push rod are held substantially normal to each other and to prevent the coupling end from coming out in a mounting state where the longitudinal axes of the cylinder main body and the push rod are substantially aligned; and an insertion groove formed in the side surface of the cylinder main body in such a manner as to be continuous with the through groove and adapted for passing a rod portion of the push rod in the inserting state.

These and other objects, features and advantages of the present invention will become more apparent upon a reading of the following detailed description and accompanying drawings.

DETAILED DESCRIPTION OF THE PREFERRED EMBODIMENTS

Figure 1:
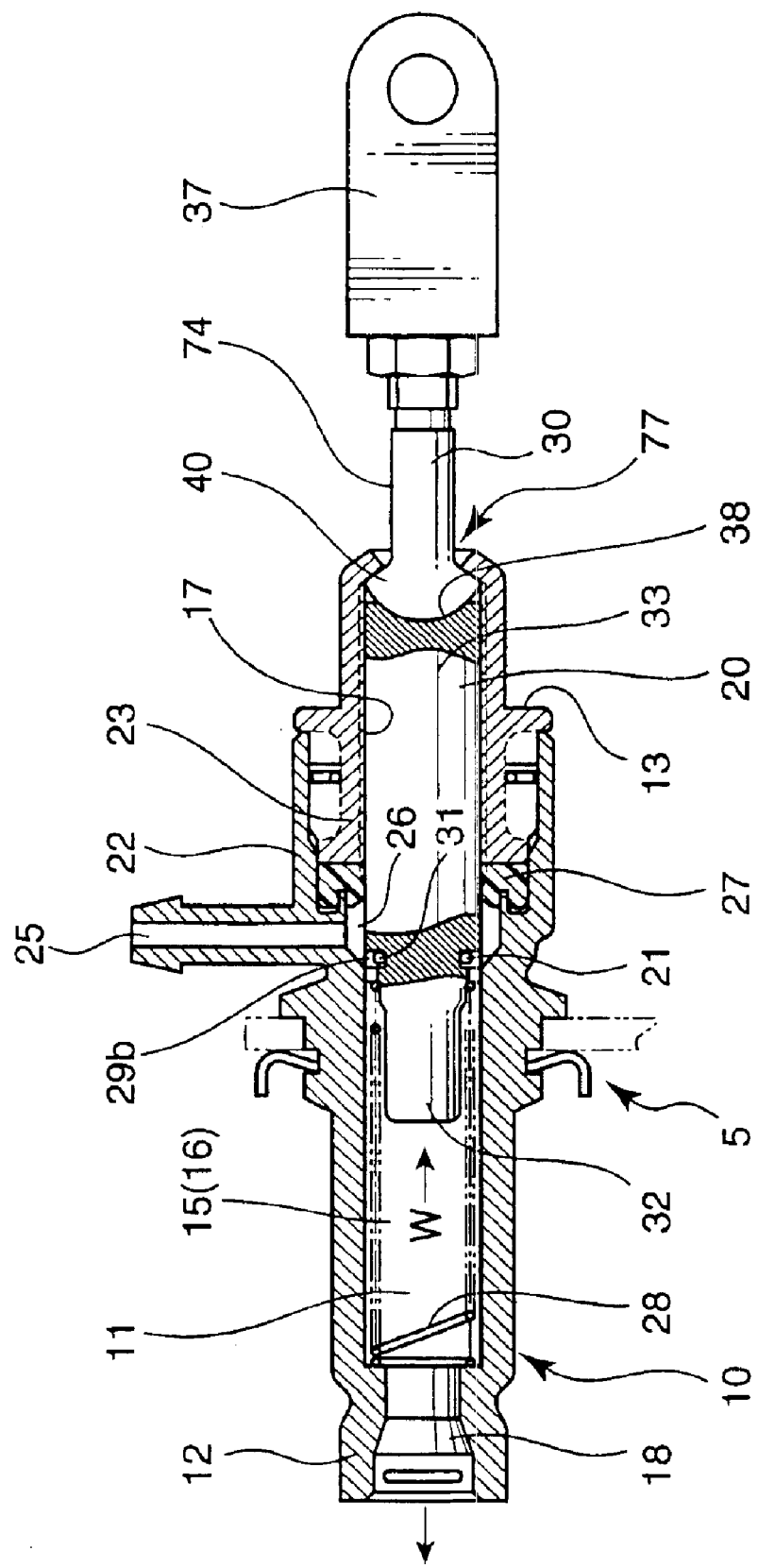
FIG. 1 is a front view in section of a master cylinder applied to a hydraulic operating system of a clutch, according to an embodiment of the invention.

A preferred embodiment of the present invention will be described. Referring to FIG. 1 showing a construction of a master cylinder applied to a hydraulic operating system of a clutch, a cylinder main body 10 of the master cylinder 5 is provided with a first main portion 12 and a second main portion 13 to be coupled to the first main portion 12. The first and second main portions 12, 13 are coupled by inserting a left end portion 23 of the second main portion 13 into a large-diameter portion 22 provided at the right end of the first main portion 12 and fixing the left end portion 23 and the large-diameter portion 22 by means of a coupling pin 60 to be described later. An opening 18 is formed at the left end of the first main portion 12, whereas an opening 77 used to insert and mount a push rod 30 is formed at the right end of the second main portion 13.

A cylinder hole 16 or a part of a cylinder hole 15 forming a pressure chamber 11 is formed inside the first main portion 12, and a slide hole 17 is formed inside the second main portion 13. The cylinder hole 16 and the slide hole 17 have the same diameter. When the first and second main portions 12, 13 are coupled, the longitudinal axes thereof are aligned to form the cylinder hole 15 in which the piston 20 is slidable. A returning spring 28 such as a coil spring for pressing and biasing the piston 20 to right is provided in the cylinder hole 15.

The piston 20 is provided with a high-pressure seal 21, which comes into sliding contact with the inner surface of the cylinder hole 16 formed in the first main portion 12. The piston 12 includes a small-diameter portion 32 at its left side and a slidable portion 33 at its right side. The small-diameter portion 32 is loosely fitted into the returning spring 28, and a plurality of grooves 29b long in longitudinal direction are formed in the outer surface of the small-diameter portion 32 while being circumferentially spaced apart (described in detail later with reference to FIG. 5). The slidable portion 33 has an outer diameter substantially equal to the inner diameter of the slide hole 17 and is slidably in contact with the slide hole 17. A contact recess 38 held in contact with a coupling end 40 formed at the left end of the push rod 30 is formed at the right end surface of the slidable portion 33.

A low-pressure chamber 26 is defined between the end portion 23 of the second main portion 13 and the cylinder hole 16, and a supplying/discharging passage 25 communicates with the low-pressure chamber 26. The high-pressure seal 21 provided on the piston 12 comes to be located in the low-pressure chamber 26 when the piston 20 reaches a rightmost position shown in FIG. 1, and the low-pressure chamber 26 communicates with the pressure chamber 11 via a plurality of grooves 29b formed in the piston 20 and the supplying/discharging passage 25. Further, the grooves 29b communicate with a groove 31 into which the high-pressure seal 21 is mounted. This groove 31 is formed in the outer circumferential surface of the piston 20.

A low-pressure seal 27 is held between the left end of the second main portion 13 and the right end of the cylinder hole 16 for sealing the low-pressure chamber 26 communicating with a reservoir (not shown) via the supplying/discharging passage 25.

Figure 2:
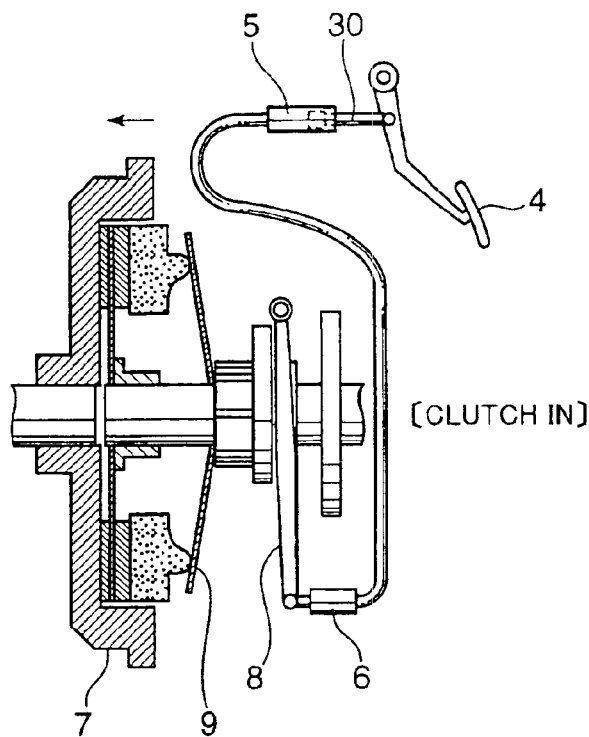
FIG. 2 is a concept diagram of a hydraulic clutch control system (clutch-IN) into which the master cylinder is incorporated.
Figure 3:
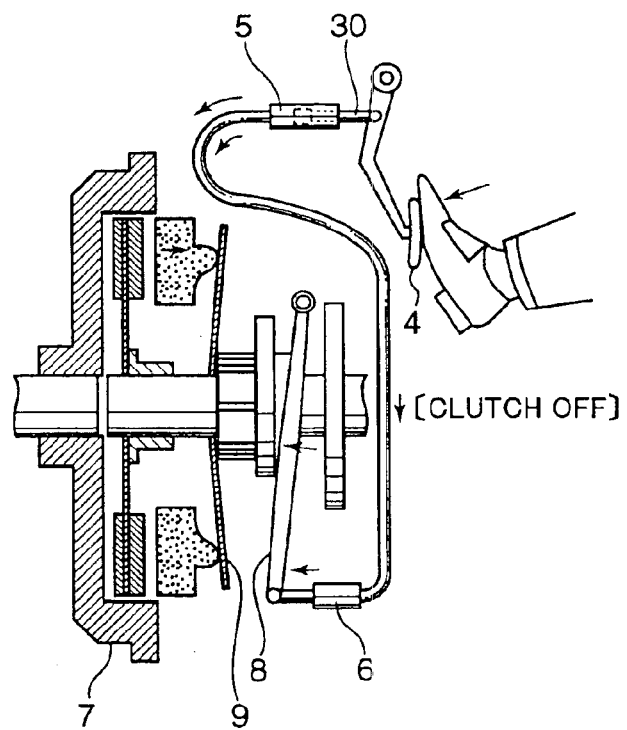
FIG. 3 is a concept diagram of the hydraulic clutch control system (clutch-OUT) into which the master cylinder is incorporated.

The operation of the master cylinder 5 will be described with reference to FIGS. 2 and 3 showing a hydraulic clutch controlling system into which the master cylinder 5 is integrated. When a clutch pedal 4 is treaded on to move the piston 20 leftward, the high-pressure seal 21 shuts off the low-pressure chamber 26 and the pressure chamber 11 from each other, whereby a hydraulic fluid in the pressure chamber 11 is supplied to an operated cylinder 6. The operated cylinder 6 having the hydraulic fluid supplied thereto pushes a leaf spring 9 via a lever 8 of a clutch 7, whereby the clutch 7 is let out as shown in FIG. 3. Thus, an engine and a transmission are disconnected from each other.

The clutch 7 is kept let out while the clutch pedal 4 is treaded on to exert the hydraulic pressure to the operated cylinder 6. Gear is changed while the clutch pedal 4 is treaded on and the clutch 7 disconnects the engine and the transmission.

When the clutch pedal 4 is freed after the gear changing operation is completed, the piston 20 of the master cylinder 5 is brought back to the clutch-IN state shown in FIG. 2 by the elastic pushing force of the returning spring 28 and the pushing force of the hydraulic pressure from the operated cylinder 6 created by a returning force of the leaf spring 9 of the clutch 7 and then returned to the rightmost position shown in FIG. 1. At this time, an excess hydraulic fluid given by the operated cylinder 6 excessively pushed back due to the abrasion of a clutch plate of the clutch 7 is fed from the pressure chamber 11 to the supplying/discharging passage 25 via a plurality of grooves 29b, thereby being returned to the reservoir.

As described above, a position where the master cylinder 5 produces a hydraulic pressure in the pressure chamber 11 when the clutch pedal 4 is treaded on is a position where the high-pressure seal 21 starts entering the cylinder hole 16. Even if the clutch plate of the clutch 7 experiences an abrasion or the like, a deviation of the operative position of the operated cylinder 6 is adjusted by returning the hydraulic fluid to the reservoir. Thus, the gear changing operation is performed at a constant position. Thus, the operating position of the clutch pedal 4 is always constant.

Figure 4:
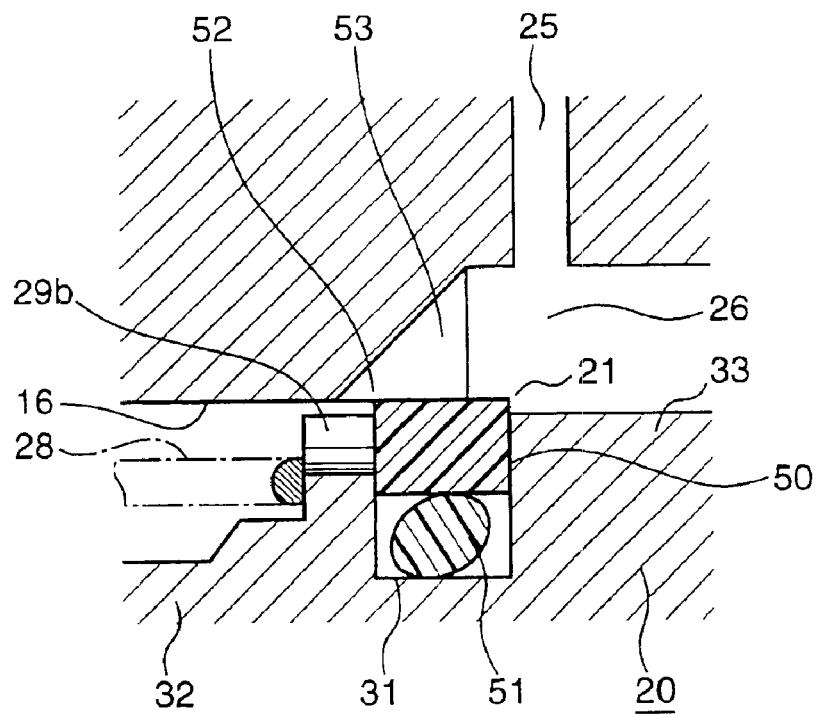
FIG. 4 is a front view showing a detailed construction of a portion near a high-pressure seal.
Figure 5:
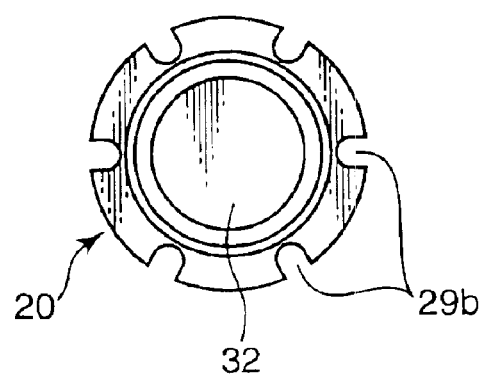
FIG. 5 is a diagram showing a detailed construction of the portion near the high-pressure seal when viewed from a direction of the arrow "W" in FIG. 1.

Referring to FIG. 4 showing a detailed construction of a portion near the high-pressure seal 21 and FIG. 5 showing the piston 20 from a direction of arrow "a" of FIG. 1, the high-pressure seal 21 is constructed such that an outer ring 50 made of a synthetic resin or the like material having a relatively high hardness is arranged at an outer side of the groove 31 and an inner ring 51 made of a material having a relatively high elasticity is arranged at an inner side of the groove 31.

The outer ring 50 has a rectangular cross section and such an outer circumferential surface as to be slidably fittable into the cylinder hole 16, and is so held in the groove 31 as to receive an elastic force of the inner ring from a radially inner side. On the other hand, the inner ring 51 has a round cross section, is inserted into the groove 31 while being compressed between the bottom surface of the groove 31 and the inner circumferential surface of the outer ring 50 and presses the outer ring 50 against the wall of the cylinder hole 16 by its elastic force.

Since the outer ring 50 is made of the synthetic resin or the like material having a relatively high hardness as described above, a corner 52 of the outer ring 50 remains to take a specified shape without being deformed by the influence of the hydraulic pressure when being located in grooves 53 formed to communicate with the low-pressure chamber 26 after the piston 20 is returned to the rightmost position shown in FIG. 1. Thus, the outer ring 50 has a function of keeping a precise opening area. Specifically, a connection area of the pressure chamber 11 and the low-pressure chamber 26 when the piston 20 is returned to the rightmost position shown in FIG. 1 suddenly increases as the piston 20 is moved since the corner 52 remains to take its precise shape.

Thus, the excess hydraulic fluid flowing into the pressure chamber 11 can be caused to quickly flow to the reservoir, and the piston 20 can be stopped at a specified position despite the state of the hydraulic fluid flowing into the pressure chamber 11 (e.g. a state where the hydraulic fluid has a low temperature and a high viscosity or a state where the hydraulic fluid is frequently supplied into and discharged from the pressure chamber 11 because of the frequent gear changing operation). Therefore, a driver can always have the constant operation feeling of the clutch pedal 4.

A plurality of grooves 29b communicating the side of the groove 31 toward the pressure chamber 11 cause the pressure chamber 11 and the low-pressure chamber 26 to communicate when the piston 20 is returned to the rightmost position shown in FIG. 1. Since the hydraulic fluid in the pressure chamber 11 acts to push the inner ring 51 via the grooves 29b at the left side of the groove 31, the bottom surface of the groove 31, the inner circumferential surface of the outer ring 50 and the side surface of the groove 31 are pressed to make a sealing force more secure.

A plurality of grooves 53 provided in the low-pressure chamber 26 are so formed in the wall of the cylinder hole 16 as to communicate with both the low-pressure chamber 26 and the cylinder hole 16. When the piston 20 is returned to the rightmost position, the grooves 53 stably hold the inner ring 51 at its rightmost position to secure the connection of the pressure chamber 11 and the low-pressure chamber 26.

Figure 6:
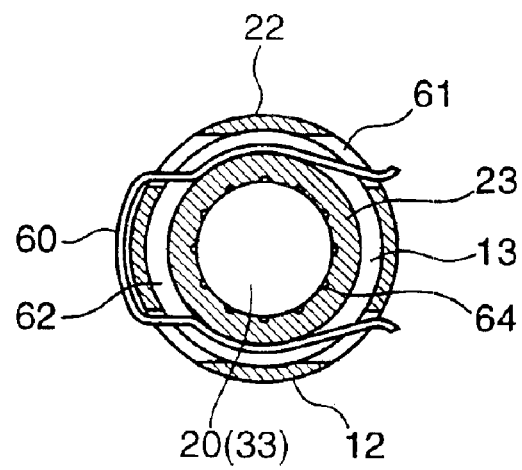
FIG. 6 is a section showing a construction for coupling a first main portion and a second main portion.

Next, the coupling portion of the cylinder main body will be described. The first and second main portions 12, 13 are coupled as follows. As shown in FIG. 6, after the end portion 23 of the second main portion 13 is inserted into the large-diameter portion 22 of the first main portion 12, windows 61 formed in the large-diameter portion 22 and a groove 62 formed in the end portion 23 are aligned and the coupling pin 60 is inserted through the windows 61, thereby being engaged with the groove 62. It should be noted that a groove 64 formed in the end portion 23 functions to hold a lubricating oil for smoothly slide the piston 20.

With the coupling device shown in FIG. 6, the first and second main portions 12, 13 can be coupled only by inserting the end portion 23 of the second main portion 13 into the large-diameter portion 22 of the first main portion 12, aligning the windows 61 and the groove 64, and inserting the coupling pin 60. Thus, the coupling can be easily made using a minimum number of parts.

Figure 7:
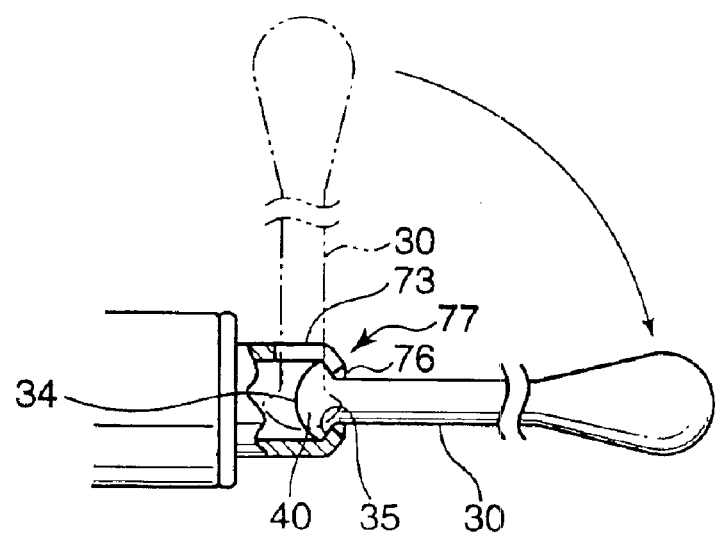
FIG. 7 is a front view partly in section showing a state when a push rod is mounted into a cylinder main body.
Figure 8:
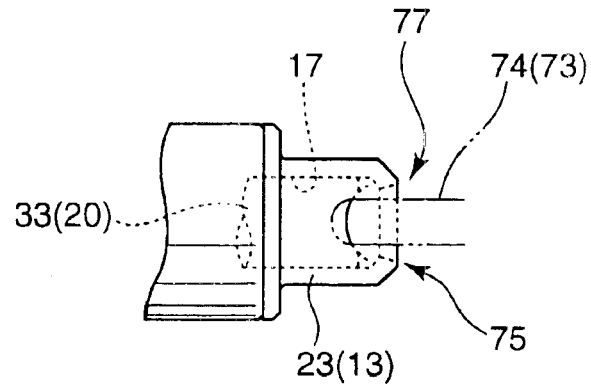
FIG. 8 is a plan view showing a mounting portion for the push rod in detail.
Figure 9:
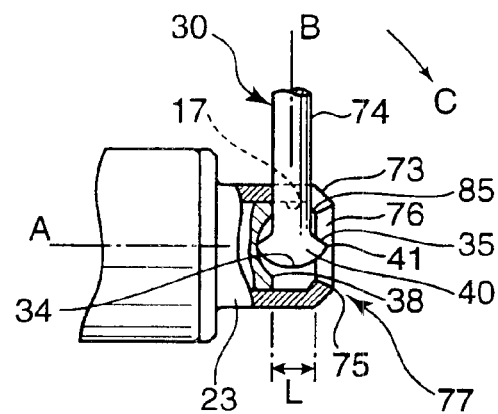
FIG. 9 is a front view in section showing the inside of the mounting portion for the push rod in detail.
Figure 10:
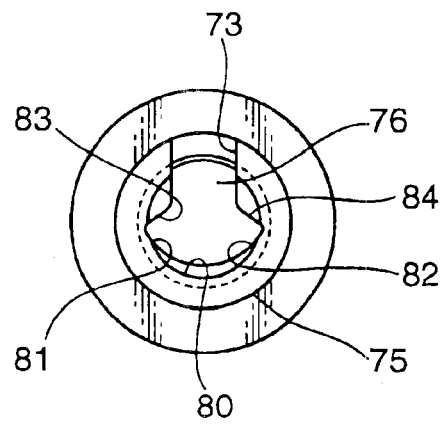
FIG. 10 is a diagram showing the outer shape of an end portion (the push rod is not shown) when viewed from right side of FIG. 1.

A mounting portion for the push rod 30 will be described with reference to FIG. 7 showing a state when the push rod 30 is mounted into the cylinder main body 10, FIG. 8 showing the mounting portion for the push rod 30 in detail, FIG. 9 showing the inside of the mounting portion for the push rod 30 in detail, and FIG. 10 showing the outer shape of the end portion 23 (the push rod is not shown) when viewed from right side of FIG. 1. It should be noted that FIG. 9 shows a state of the push rod 30 at the time of insertion and the push rod 30 is mounted by being turned in a direction C after the insertion.

The coupling end 40 is formed at one end of a rod portion 74 of the push rod 30 and has a large-diameter portion 41 radially projecting over the entire circumference of the rod portion 74. A convex first contact portion 35 to be held in contact with the contact recess 38 of the piston 20 is formed at a side of the large-diameter portion 41 opposite from the rod portion 74, and a convex second contact portion 35 is formed at the side of the large-diameter portion 41 opposite from the first contact portion 34. The contact recess 38 and the first contact portion 34 take the shapes of parts of spherical surfaces having substantially the same radii of curvature. Further, the second contact portion 35 is formed at a radially outer part of the rod portion 74.

On the other hand, the end portion 23 into which the coupling end 40 is to be mounted is formed into a substantially cylindrical shape having the slide hole 17 inside and is formed with the opening 77 through which the push rod 30 is inserted and mounted. The opening 77 is so formed at the outer circumferential side of the end portion 23 as to be parallel with the longitudinal axis of the end portion 23 as shown in FIG. 8, and includes an insertion groove 73 having such a width as to enable the rod portion 74 of the push rod 30 to be loosely fittable therethrough and a through groove 76 formed in an end surface 75 of the end portion 23.

The insertion groove 73 has such a length L that the coupling end 40 can be accommodated into the slide hole 17 and turned in the direction C by 90° as shown in FIG. 9. The insertion groove 73 is continuous with the through groove 76, which takes a shape corresponding to the coupling end 40, i.e. a shape obtained by combining a projected shape of the coupling end 40 in a direction normal to the longitudinal axis of the push rod 30 and a projected shape of the rod portion 74 of the push rod 30 in the same direction. More specifically, as shown in FIG. 10, the through groove 76 is comprised of a first section 80 which projects down in a convex manner and into which the first contact portion 34 is loosely fittable, second sections 81, 82 which are so shaped as to coincide with a projected line of the first contact portion 34, project sideways in a convex manner and are continuous with the first section 80, and third sections 83, 84 which are formed to connect the second sections 81, 82 and the insertion groove 73 and so inclined as to coincide with the projected line of the second contact portion 35. Since the through groove 76 is shaped as above, the coupling end 40 can be inserted therethrough with a longitudinal axis A of the end portion 23 (cylinder main body 10) held normal to that B of the push rod 30 as shown in FIGS. 7 and 9. Further, a locking surface 85 to be brought into contact with the second contact portion 35 is formed on the inner surface of the end surface 75. The locking surface 85 and the second contact portion 35 are formed to have such shapes corresponding to parts of spherical surfaces having substantially the same radii of curvature.

The push rod 30 and the piston 20 are coupled as follows. First, as shown in FIG. 9, the longitudinal axis B of the push rod 30 is held at a right angle to that A of the cylinder main body 10, the push rod 30 is moved in such a direction as to push the piston 20 (leftward direction) while keeping its posture, and the coupling end 40 is passed through the through groove 76. In this way, the rod portion 73 moves in the insertion groove 73 and the coupling end 40 pushes the piston 20 to left, whereby the coupling end 40 reaches the position shown in FIG. 9. Thereafter, the leading end (coupling end 37 with the clutch pedal shown in FIG. 1) of the push rod 30 is turned by 90° in the direction C with the coupling end 40 held at the above position. Then, the contact recess 38 comes into contact with the first contact portion 34 and the second contact portion 35 comes into contact with the locking surface 85, thereby completing the coupling of the piston 20 and the push rod 30. At this time, since the second contact portion 35 is in contact with the locking surface 85 and the coupling end 40 is formed with the large-diameter portion 41 having a larger diameter than the insertion groove 73, the coupling end 40 does not come out of the through groove 76 and the insertion groove 73.

When the above coupling operation is completed, the elastic pushing force of the returning spring 28 acting on the piston 20 acts to push the second contact portion 35 against the locking surface 85 via the first contact portion 34 of the coupling end 40.

Accordingly, in the case of the thus constructed mounting mechanism of this embodiment, the push rod 30 can be readily and easily mounted by being turned after the coupling end 40 thereof formed beforehand is passed through the through groove 76 of the cylinder main body 10. No tool is required for this mounting operation.

In this embodiment, even if the push rod 30 is displaced from the inserting state to the mounting state, the first contact portion 34 thereof slides in contact with the contact recess 38 of the piston 20, i.e. the piston 20 is held at the specified position. Thus, an operating force required for the mounting is sufficient to slightly exceed the elastic force of the returning spring 28. In other words, it is not necessary to move the piston 20 against the pushing force of the returning spring 28: a force to merely turn the push rod 30 to a horizontal position is sufficient. Thus, the push rod 30 can be easily turned to the horizontal position. Further, since the second contact portion 35 is slidably in contact with the locking surface 85 defined around the through groove 76 in the mounting state of the push rod 30, even if the push rod 30 is inclined with respect to the cylinder main body 10 by such a force as to incline the push rod 30, the push rod 30 and the cylinder main body 10 are held locked into each other without any problem.

In addition, in this embodiment, even if the piston 20 is moved to left by operating the push rod 30, the pushing force from the push rod 30 via the piston 20 and the pushing force from the piston 20 to the push rod 30 can be smoothly transmitted since the first contact portion 34 and the contact recess 38 are held in contact at the convex and concave surfaces thereof having arcuate cross sections. Further, since the large-diameter portion 41 of the coupling end 40 is guided by the slide hole 17, the push rod 30 can be stably operated even if a vibration or the like acts thereon. Furthermore, since the insertion groove 73 is formed to have such a length L as to turn the push rod 30 by 90° in the direction C while accommodating the coupling end 40 into the slide hole 17, the push rod 30 can be displaced from the inserting state to the mounting state by moving the piston 20 against the pushing force of the returning spring 28.

Next, an air discharging operation and a clutching operation of the master cylinder in the mounting mechanism for the push rod of the master cylinder according to the embodiment are described.

The cylinder main body 10 having the push rod 30 mounted therein has the supplying/discharging passage 25 connected with the reservoir, and the opening 18 of the first main portion 12 is connected with the operated cylinder 6.

In such a state, a bleeder of the operated cylinder 6 is opened and the hydraulic fluid is supplied to the reservoir. Then, this hydraulic fluid flows from the supplying/discharging passage 25 into the pressure chamber 11 via the low-pressure chamber 26 and further into the operated cylinder 6.

If the hydraulic fluid is filled into the cylinder main body 10 and the operated cylinder 6 in this way, the hydraulic fluid in the pressure chamber 11 is supplied to the operated cylinder 6 by treading on the clutch pedal 4 to move the piston 20 to left. Then, the hydraulic fluid gushes out of the bleeder of the operated cylinder 6. Upon the confirmation of this gush, air is completely discharged from a pipe extending from the cylinder main body 10 to the operated cylinder 6. Thereafter, the bleeder of the operated cylinder 6 is closed and the clutch pedal 4 is freed. By freeing the clutch pedal 4, the piston 20 tries to return to the rightmost position of FIG. 1 by the elastic pushing force of the returning spring 28. However, an amount of the hydraulic fluid corresponding to a leak from the portion near the high-pressure seal 21 is supplied to the pressure chamber 11 since the supplying/discharging passage 25 and the pressure chamber 11 are shut off by the high-pressure seal 21. Further, by setting the elastic pushing force of the returning spring 28 stronger than a vacuum force acting on the piston 20, the piston 20 gradually returns and, when the high-pressure seal 21 reaches the position of the low-pressure chamber 26, the supplying/discharging passage 25 and the pressure chamber 11 are connected to supply the hydraulic fluid from the reservoir.

When the clutch pedal 4 is treaded on, this operating force is transmitted to the piston 20 via the push rod 30. Thus, the high-pressure seal 21 is fitted into the cylinder hole 16 and the hydraulic fluid in the pressure chamber 11 is supplied to the operated cylinder 6. The operated cylinder 6 pushes the lever 8 via the leaf spring 9, whereby the clutch 7 is let out as shown in FIG. 3. The clutch 7 is kept let out while the clutch pedal 4 is treaded on.

When the clutch pedal 4 is freed, the hydraulic fluid in the operated cylinder 6 is pushed back to the pressure chamber 11 of the cylinder main body 10 by the force of the leaf spring 9 acting on the operated cylinder 6. Thus, the piston 20 is returned to the rightmost position. At this time, if the operated cylinder 6 is excessively pushed back beyond the specified position due to the abrasion of the clutch plate of the clutch 7, the hydraulic fluid pushed back from the operated cylinder 6 is returned to the reservoir via the pressure chamber 11 and the low-pressure chamber 26 connected with the pressure chamber 11. Therefore, the piston 20 is held at the rightmost position.

In this way, the cylinder main body 10 of this embodiment conducts a position adjustment even if the clutch plate of the clutch 7 is abraded while the clutch 7 is repeatedly let in and out. Therefore, the operative position of the clutch pedal 4 can be constantly held at the specified position, with the result that a driver can have a constant operation feeling.

Although the coupling portions of the cylinder main body are coupled by the coupling pin 60 in the foregoing embodiment, the present invention is not limited thereto. Another mechanism may be taken.

Figure 11A:
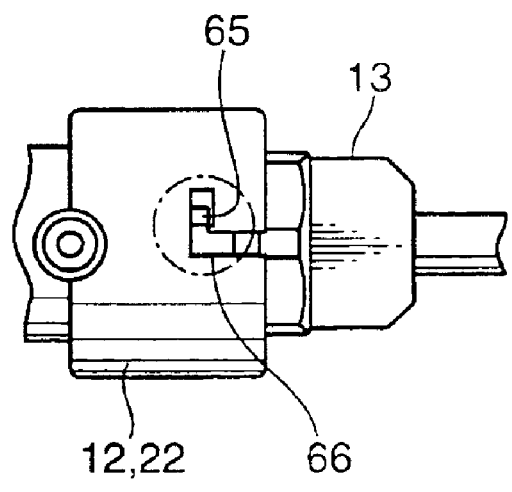
FIG. 11A is a plan view showing another mechanism for coupling the first main portion and the second main portion.
Figure 11B:
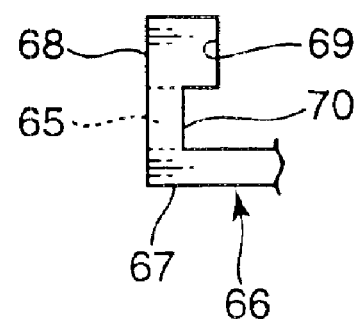
FIG. 11B is an enlarged diagram of a portion encircled by a phantom line in FIG. 11A.
Figure 12:
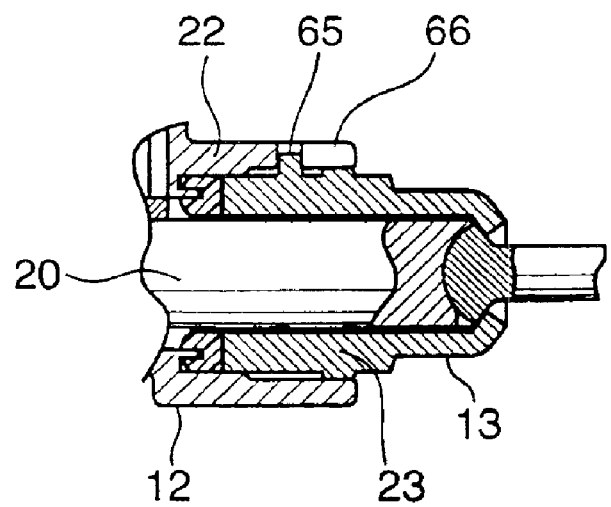
FIG. 12 is a front view in section of the mechanism shown in FIG. 11A.
Figure 13:
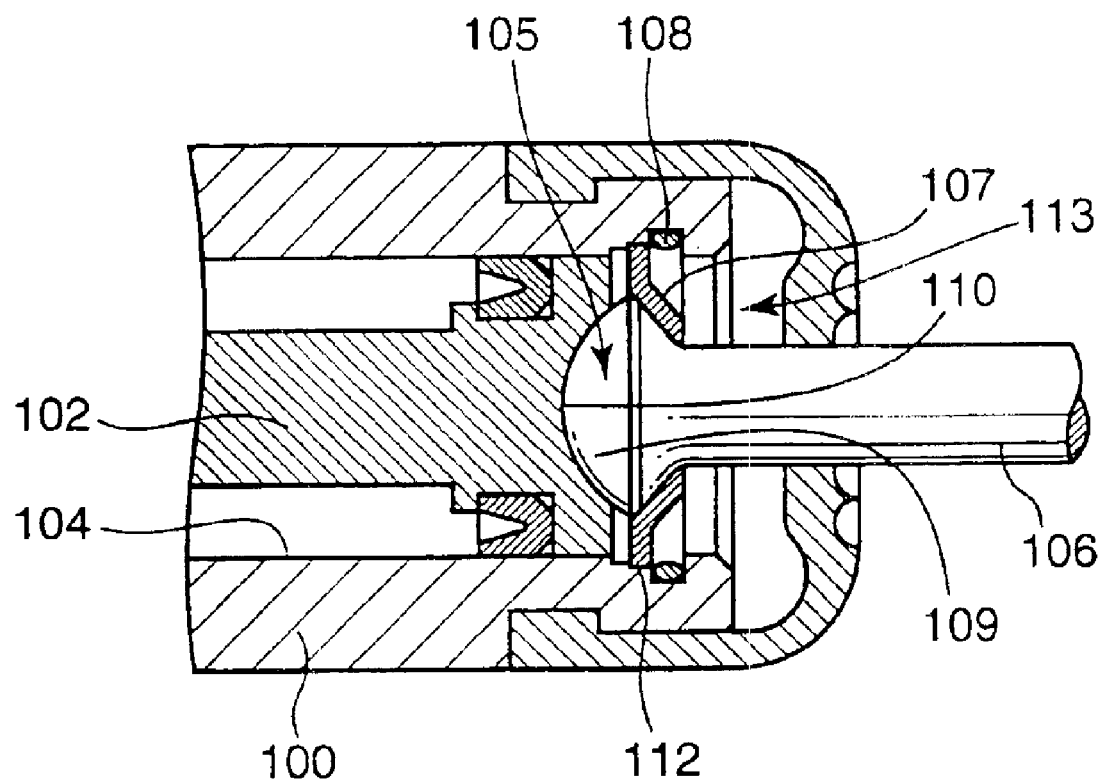
FIG. 13 is a sectional view showing a prior art mounting mechanism for a push rod of a master cylinder.

Referring to FIGS. 11A, 11B and 12 showing another mechanism for coupling the first main portion and the second main portion, the coupling mechanism is constructed such that the end portion 23 of the second main portion 13 is provided with a projecting claw 65 and the first and second main portions 12, 13 are coupled by inserting the claw 65 into an L-shaped groove 66 formed in the large-diameter portion 22 of the first main portion 12 and turning it.

The groove 66 includes a straight groove 67 which is parallel with the longitudinal axis of the large-diameter portion 22 and into which the claw 65 is loosely insertable, and a key groove 68 substantially at a right angle to the straight groove 67. The key groove 68 is comprised of a key projection 70 close to the straight groove 67 and a hooking portion 69 continuous with the key projection 70 at the back side.

With this coupling mechanism thus constructed, the claw 65 of the second main portion 13 is inserted into the straight groove 67 of the first main portion 12 and moved in coupling direction and, when the claw 65 reaches the back end of the straight groove 67, the first and second main portions 12, 13 are turned in opposite directions to insert the claw 65 into the key groove 68. After the claw 65 reaches the position of the key groove 68 beyond the key projection 70, the piston 20 is pushed to right by the elastic pushing force of the returning spring 28. Thus, the claw 65 is inserted into the hooking portion 69 and engaged with the key projection 70.

In the coupling mechanism shown in FIGS. 11A, 11B, and 12, since the first and second main portions 12, 13 can be completely coupled by inserting the claw 65 formed in the second main portion 13 into the groove 66 formed in the first main portion 12 and turning the first and second portions 12, 13, no coupling part (coupling pin) is necessary unlike the aforementioned coupling mechanism shown in FIG. 6 and the cylinder main body 10 can be assembled in one step.

In the foregoing embodiment, the through groove is formed to have such a shape obtained by combining the projected shape of the coupling end when viewed in the direction normal to the longitudinal axis of the push rod and that of the rod portion when viewed in the same direction because the longitudinal axis of the push rod is held normal to that of the cylinder main body and the coupling end is inserted into the through groove while this posture is maintained. However, the present invention is not limited thereto. For example, the longitudinal axis may be held oblique to that of the cylinder main body and the coupling end is inserted into the through groove while this posture is maintained. In such a case, the through groove is preferably so formed as to have substantially the same shape as the one obtained by the projected shapes of the coupling end and the rod portion when viewed in the same direction as the inserting direction (direction oblique to the coupling end and the rod portion).

Although the coupling end has the large-diameter portion in the foregoing embodiment, the present invention is not limited thereto. For example, the coupling end may have a pair or two or more pairs of projections symmetrically projecting outward with respect to the longitudinal axis of the push rod. However, in this case, there is a possibility that the push rod comes out of the cylinder main body if the push rod or the cylinder main body is rotated about its longitudinal axis since the through groove is formed to have substantially the same shape as such a coupling end. Therefore, the coupling end preferably has such a large-diameter as in the foregoing embodiment.

As described above, an inventive mounting mechanism is adapted for a push rod of a master cylinder. A piston is reciprocally movably provided in a cylinder hole of a main body of the cylinder having openings at the opposite ends. The piston is brought into contact by a pushing force of a returning spring with one end of the push rod inserted and mounted from the one end of the cylinder main body. The push rod includes a radially projecting coupling end at the end thereof to be brought into contact with the piston.

The mounting mechanism includes: in the opening side of the cylinder main body that the push rod is to be mounted, a through groove formed at an end surface of the cylinder main body to have such a shape as to pass the coupling end in an inserting state where the longitudinal axes of the cylinder main body and the push rod are held substantially normal to each other and to prevent the coupling end from coming out in a mounting state where the longitudinal axes of the cylinder main body and the push rod are substantially aligned; and an insertion groove formed in the side surface of the cylinder main body in such a manner as to be continuous with the through groove and adapted for passing a rod portion of the push rod in the inserting state.

In this mechanism, the coupling end of the push rod is inserted through the opening at the side of the cylinder main body where the push rod is to be mounted with the longitudinal axis of the push rod held substantially normal to that of the cylinder hole, and the coupling end is moved toward the cylinder hole together with the piston while being held in contact with the piston. At this time, the rod portion of the push rod is moved along the insertion groove. Thereafter, the mounting of the push rod is completed by turning the push rod to extend along the longitudinal axis of the cylinder hole. Thus, the push rod can be readily and easily mounted into the cylinder main body without using any tool and any part.

Preferably, the coupling end may include a large-diameter portion projecting outward over the entire circumference, and the large-diameter portion comes into contact with the edge of the through groove.

With this construction, if the push rod is brought to the mounting state after the large-diameter portion of the coupling end is passed through the through groove in the inserting state where the longitudinal axes of the cylinder main body and the push rod are substantially normal to each other, the large-diameter portion comes into contact with the edge of the through groove. The coupling end formed with the large-diameter portion can be securely held in contact with the edge of the through groove as compared to such a coupling end partially projecting radially of the push rod. Therefore, the push rod can be securely prevented from coming out of the cylinder main body.

Preferably, the large-diameter portion may have a convex first contact portion at a side thereof to be brought into contact with the piston, a contact recess to be brought into contact with the first contact portion is so formed at a position of the piston facing the first contact portion as to have a shape corresponding to a part of a spherical surface having substantially the same radius of curvature as the first contact portion.

With this construction, even if the push rod is displaced from the inserting state to the mounting state, the first contact portion thereof slides in contact with the contact recess of the piston, i.e. the piston is held at a specified position. Thus, the push rod can be easily turned with a force sufficient to do it without making it necessary to move the piston against the pushing force of the returning spring.

Preferably, the large-diameter portion may have a convex second contact portion on an outer portion of the rod portion at a side thereof opposite from the first contact portion, and a locking surface with which the second contact portion slidably comes into contact in the mounting state is formed around the through groove.

With this construction, since the second contact portion slidably comes into contact with the locking surface formed around the through groove in the mounting state, even if a force acts to incline the push rod with respect to the cylinder main body, the cylinder main body and the push rod can be locked into each other without any problem.

The locking surface may be a concave surface having substantially the same radius of curvature as the second contact portion or a flat surface. However, it may be preferably the former surface: concave surface having substantially the same radius of curvature as the second contact portion, in order to suppress fine movements of the piston resulting from the inclination of the push rod mounted on a pivotal pedal.

Preferably, the insertion groove may have such a length that the coupling end can be accommodated into the cylinder hole so that the push rod can be inserted through the insertion groove.

If the insertion groove is short, the push rod cannot be displaced from the inserting position to the mounting position. By setting the insertion groove to have a specified length or longer, the push rod can be displaced from the inserting position to the mounting position by moving the piston against the pushing force of the returning spring.

Preferably, the cylinder main body may be constructed by coupling a first main portion in which a pressure chamber is defined by the cylinder hole and the piston and a second main portion formed with a slide hole to communicate with the cylinder hole upon being connected with the first main portion.

In this construction, with the first and second main portions separated, necessary parts such as the returning spring and the piston are inserted into the first main portion.

Thereafter, the first and second main portions are coupled to assemble the cylinder main body. Thus, the cylinder can be assembled with improved operability.

This application is based on patent application No. 2002-345868 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A mounting mechanism for a push rod of a master cylinder in which a piston is reciprocally movably provided in a cylinder hole of a cylinder main body having openings at the opposite ends, and the piston is brought into contact by a pushing force of a returning spring with one end of the push rod inserted and mounted from the one end of the cylinder main body, the push rod includes a radially projecting coupling end at the end thereof to be brought into contact with the piston, the mounting mechanism comprising: at the side of the cylinder main body that the push rod is to be mounted, a through groove formed at an end surface of the cylinder main body to have such a shape as to pass the coupling end in an inserting state where the longitudinal axes of the cylinder main body and the push rod are held substantially normal to each other and to prevent the coupling end from coming out in a mounting state where the longitudinal axes of the cylinder main body and the push rod are substantially aligned; and an insertion groove formed in the side surface of the cylinder main body in such a manner as to be continuous with the through groove and adapted for passing a rod portion of the push rod in the inserting state.

2. A mounting mechanism according to claim 1, wherein the coupling end includes a large-diameter portion projecting outward over the entire circumference, and the large-diameter portion comes into contact with the edge of the through groove.

3. A mounting mechanism according to claim 2, wherein the insertion groove has such a length that the coupling end can be accommodated into the cylinder hole so that the push rod can be inserted through the insertion groove.

4. A mounting mechanism according to claim 2, wherein the cylinder main body is constructed by coupling a first main portion in which a pressure chamber is defined by the cylinder hole and the piston and a second main portion formed with a slide hole to communicate with the cylinder hole upon being connected with the first main portion.

5. A mounting mechanism according to claim 2, wherein the large-diameter portion has a convex first contact portion at a side thereof to be brought into contact with the piston, a contact recess to be brought into contact with the first contact portion is so formed at a position of the piston facing the first contact portion as to have a shape corresponding to a part of a spherical surface having substantially the same radius of curvature as the first contact portion.

6. A mounting mechanism according to claim 5, wherein the insertion groove has such a length that the coupling end can be accommodated into the cylinder hole so that the push rod can be inserted through the insertion groove.

7. A mounting mechanism according to claim 5, wherein the cylinder main body is constructed by coupling a first main portion in which a pressure chamber is defined by the cylinder hole and the piston and a second main portion formed with a slide hole to communicate with the cylinder hole upon being connected with the first main portion.

8. A mounting mechanism according to claim 5, wherein the large-diameter portion has a convex second contact portion on an outer portion of the rod portion at a side thereof opposite from the first contact portion, and a locking surface with which the second contact portion slidably comes into contact in the mounting state is formed around the through groove.

9. A mounting mechanism according to claim 8, wherein the insertion groove has such a length that the coupling end can be accommodated into the cylinder hole so that the push rod can be inserted through the insertion groove.

10. A mounting mechanism according to claim 9, wherein the cylinder main body is constructed by coupling a first main portion in which a pressure chamber is defined by the cylinder hole and the piston and a second main portion formed with a slide hole to communicate with the cylinder hole upon being connected with the first main portion.

11. A mounting mechanism according to claim 8, wherein the cylinder main body is constructed by coupling a first main portion in which a pressure chamber is defined by the cylinder hole and the piston and a second main portion formed with a slide hole to communicate with the cylinder hole upon being connected with the first main portion.

12. A mounting mechanism according to claim 1, wherein the insertion groove has such a length that the coupling end can be accommodated into the cylinder hole so that the push rod can be inserted through the insertion groove.

13. A mounting mechanism according to claim 1, wherein the cylinder main body is constructed by coupling a first main portion in which a pressure chamber is defined by the cylinder hole and the piston and a second main portion formed with a slide hole to communicate with the cylinder hole upon being connected with the first main portion.

* * * * *